May 8, 1962  J. H. JOHNSON  3,033,525
FORCE-TRANSMITTING DEVICE
Filed Oct. 28, 1958  6 Sheets-Sheet 1

James H. Johnson
INVENTOR.

BY Browning, Simms,
Hyer & Eichenroht
ATTORNEYS

May 8, 1962  J. H. JOHNSON  3,033,525
FORCE-TRANSMITTING DEVICE
Filed Oct. 28, 1958  6 Sheets-Sheet 2

INVENTOR.
James H. Johnson
BY Browning, Simms,
Hyer & Cickenscht
ATTORNEYS

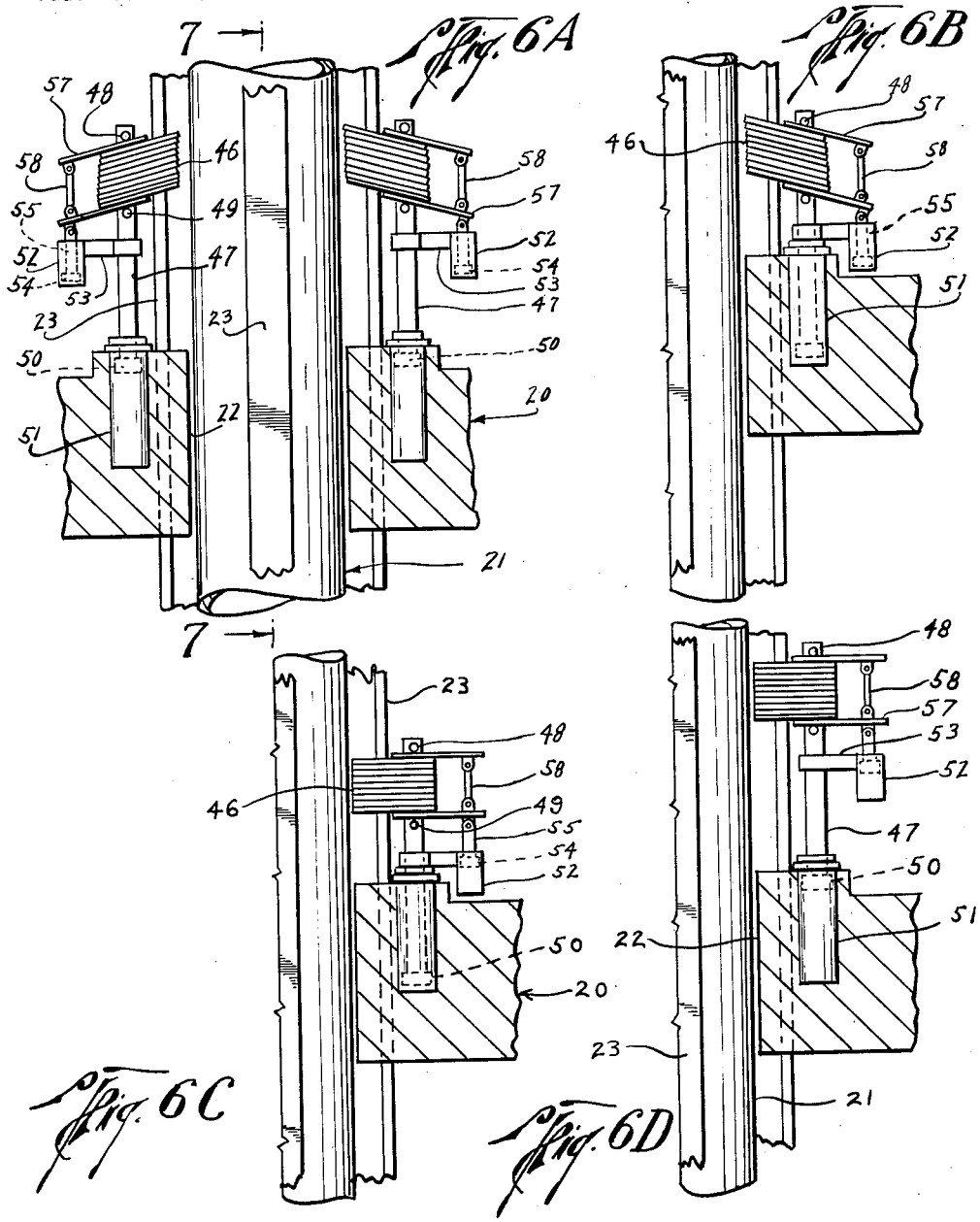

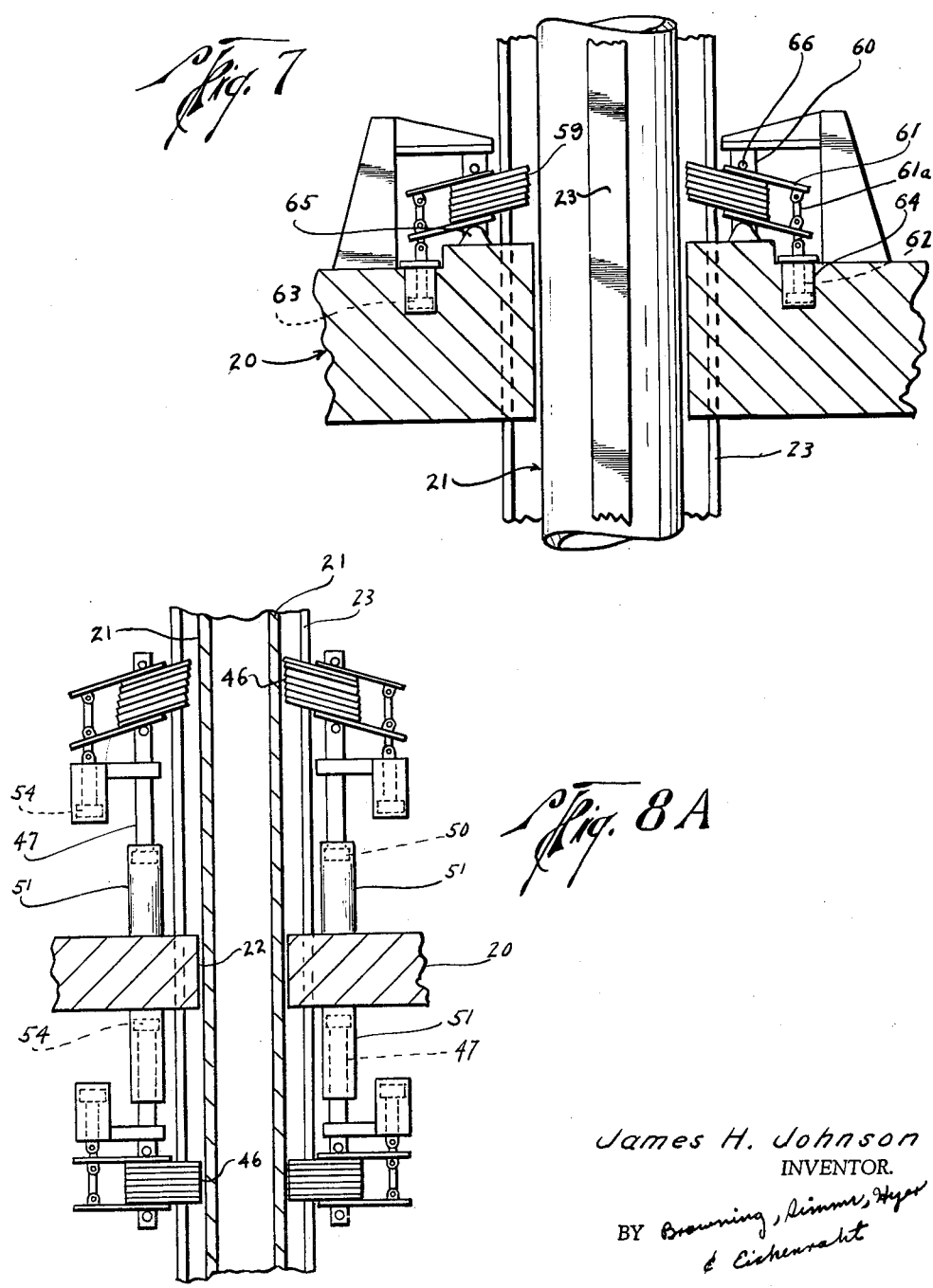

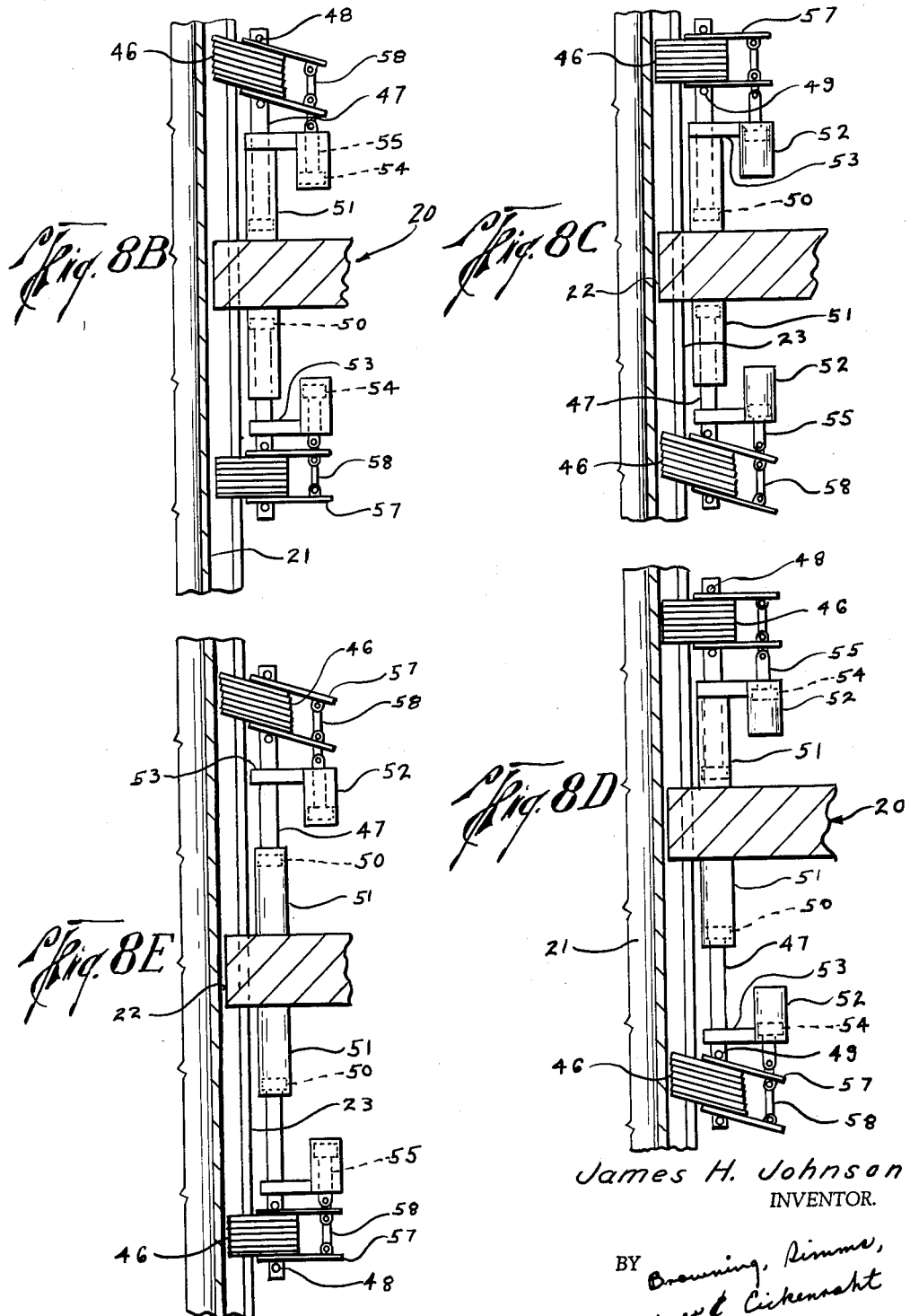

May 8, 1962   J. H. JOHNSON   3,033,525
FORCE-TRANSMITTING DEVICE
Filed Oct. 28, 1958   6 Sheets-Sheet 6

James H. Johnson
INVENTOR.

BY Browning, Simmons
Heyer & Eickenroht
ATTORNEYS

United States Patent Office 3,033,525
Patented May 8, 1962

3,033,525
FORCE-TRANSMITTING DEVICE
James H. Johnson, Beaumont, Tex., assignor, by mesne assignments, to Dresser Industries, Inc., Dallas, Tex., a corporation of Delaware
Filed Oct. 28, 1958, Ser. No. 770,173
8 Claims. (Cl. 254—107)

This invention relates generally to an improved device for transmitting a force between a movable member and a fixed member in order to move the former with respect to the latter. This invention finds particular utility in off-shore drilling operations, wherein it may be desired to skid a drilling rig into and out of drilling position over the deck of a platform and to raise and lower the platform with respect to the piles or spuds upon which it is supported.

It is conventional practice to skid the drilling rig over the upper flanges of I beams on the platform which extend longitudinally thereof. It has also been proposed to raise and lower the platform along flanges extending vertically the length of the spuds. In each case, an actuator of some type, such as an hydraulic jack, is connected at its opposite ends to the members to move one member a desired amount relative to the other. However, one end of the actuator has been removably attached to the flanged member by means of pins insertable through holes in the flange or lugs welded thereto. Not only has the addition of such attaching parts weakened the flange, but also since their location controls the place at which the actuator may be attached to the flanged member, the operator has had to choose the closest parts to suit his purposes. This is undesirable both in locating a drilling rig on the platform and in raising and lowering the platform, particularly in the latter case since it prevents accurate leveling of the platform. Also, it has been necessary to completely reassemble the actuators with respect to such members in order to reverse the transmission of force therebetween.

An object of this invention is to provide a device for the above-described or similar purposes which does not require holes, lugs or other attaching parts on the flange of one of the members.

Another object is to provide such a device which releasably grips the flange of one of the members without permanently distorting it, such that the flange may be gripped from time to time by other such devices.

A further object is to provide such a device which is easily and quickly connectable between the two members.

Still another object is to provide a device of this general type which may be used to either push or pull the member to be moved.

A still further object is to provide devices of this type which are particularly well suited for use in skidding the drilling rig and raising and lowering the platform, respectively.

These and other objects are accomplished, in accordance with the present invention, by a device which includes a rod connectable to one of the members for movement in opposite directions with respect thereto and a plurality of face-to-face plates having openings therein to receive the other member and surrounding the rod in a manner to permit the plates to swing between a tilted position for gripping the other member and a position substantially perpendicular to the other member for movement longitudinally therealong. Means are carried by the rod for swinging the plates between said substantially perpendicular and said tilted position to form a force-transmitting connection between the other member and the rod, during movement of the rod in one direction, and swinging them from said tilted to said substantially perpendicular position to shift the plates to a different longitudinal position along the other member, during movement of the rod in the opposite direction.

Thus, with the other member being fixed and the rod connected to the one member by an actuator, such as an hydraulic jack having a cylinder attached to such one member and a piston on the rod reciprocable within the cylinder, said one member may be moved with respect to the other member a distance corresponding to the stroke of the piston upon each reciprocation thereof. On the other hand, with the one member being fixed, the other member may be moved with respect thereto in similar fashion. Obviously, the plates may grip the other member at any point therealong. Also, the force with which the other member is gripped is distributed over the several plates so that such other member is not permanently distorted. Furthermore, the device is assembled between the members merely upon attachment of the actuator to the one member and disposal of the plate openings over the other.

In one form of the invention, which is particularly well suited for moving the members relatively to one another in a substantially horizontal direction, the plates are swung from their substantially perpendicular position into their tilted position to form a force-transmitting connection between the other member and rod merely in response to movement of the rod in the one direction, and are swung from their tilted position into their substantially perpendicular position and then moved with the rod to shift them to a different longitudinal position along the other member merely in response to movement of the rod in the opposite direction.

In this form, the plates are disposed substantially vertically such that the edges of their openings engage the other member with sufficient friction to cause them to pivot about such edges as spaced apart pins on the rod engage with the outermost plates to one side of the openings therein. Thus, upon movement of the rod in the one direction, the plates are first swung from their substantially perpendicular into their tilted position and then tightly grip the rod. However, abutments on the rod engage with the outermost plates during movement of the rod in the opposite direction to locate the plates in their substantially perpendicular position, such that the plates are swung from their tilted into their substantially perpendicular position and prevented from tilting to the other side thereof as the rod continues in said opposite direction to shift the plates, in the manner described. More particularly, each abutment is disposed adjacent one of the pins, one such abutment engaging an outermost plate intermediate its adjacent pin and the opening in such plate, and the other abutment engaging the other outermost plate on the side of its adjacent pin away from the opening in such plate.

In another form of the invention particularly well suited for moving one member with respect to the other in a substantially vertical direction, the plates do not frictionally engage the other member with sufficient force to pivot as in the first form. Therefore, the plates are swung between tilted and substantially perpendicular positions by a means which, although carried by the rod, is operable independently of its movement. As in the form above described, pins on the rod may engage with the outermost plates to form a force-transmitting connection between the other member and rod and move the plates with the rod to shifted position along such other member. Preferably, the means for swinging the plates comprises an actuator such as a cylinder carried by the rod and having a piston reciprocable therein, and a rod on the piston extending exteriorly of the cylinder and connected to the plates for swinging them between their substantially perpendicular and tilted positions in response to reciprocation of the piston. Thus, in this form, the plates are first moved into and held in either their tilted or substantially perpendicular positions, and the rod is then moved by the actuator to form a force-transmitting connection or shift the plates in the manner described.

In accordance with a further novel aspect of the first form of the present invention, the means for moving the plates with them in said opposite directions and swinging them between tilted and substantially perpendicular positions includes parts which are shiftable to positions to form a force-transmitting connection between the other member and the rod, during movement of the rod in the opposite direction, and for shifting the plates to a different longitudinal position along the other member during movement of the rod in said one direction. Thus, the device is adjustable to reverse the direction of movement of the movable member without removing it from or reversing it with respect to its connection with either member. More particularly, the relative positions of only the abutments need be reversed, either by a releasable connection of the rod to the reciprocable part of the actuator, to permit the rod to be rotated 180 degrees about its axis, or by a releasable connection of the abutments to the rods in either the positions intermediate their adjacent pins and the openings in the plate they engage or at the side of the pin away from such openings.

In offshore drilling apparatus, wherein a platform is supported at an offshore location by means of anchored spuds received through openings in the platform and having flanges extending longitudinally thereof, one or more of such devices is connected between the platform and each flange for moving the platform vertically along the spuds. Each such device comprises a plurality of the above-described plates having openings therein to receive a flange on a spud, a cylinder on the platform, a piston reciprocable within the cylinder, and a rod on the piston extending exteriorly thereof and having means for swinging and moving the plates in the manner described in connection with the second form of the invention. Still further means are provided for holding the platform against downward movement with respect to each spud during shifting of the plates of a device to a different longitudinal position along the flange of the spud.

In apparatus of this type, the weight of the platform is at all times suspended from the spuds. Thus, the direction of movement of the platform with respect to the spuds depends merely upon the direction of movement of the piston with respect to the platform. That is, while downward movement of the piston will effect a raising of the platform, upward movement thereof will lower the platform without, at the same time, moving the plates from their tilted position forming a force-transmitting connection between the rod and flanges.

In one embodiment of such offshore drilling apparatus, this holding means comprises additional devices, each of which is also similar to the second form of the invention, except that the rod on which the plates are supported is fixed to, rather than being reciprocable with respect to, the platform since the plates thereof need not be shifted to a position for taking a new grip on the flange. Thus, while the plates of the first devices are tilted to grip the flange and the rod supporting them is moved to in turn move the platform vertically with respect to the spuds, the plates of the additional devices are disposed in their substantially perpendicular position for movement longitudinally over the flange which its openings receive. On the other hand, when the platform has been moved a desired extent, the plates of the additional devices are swung into their tilted positions to grip and hold the flange, so that the plates of the first devices may be swung into their substantially perpendicular position and moved to a different longitudinal position along the flange.

In another form of such apparatus, a pair of devices of the type above described are connected between the platform and each spud, with the rods of one device of each pair extending upwardly from the top side of the platform and the rod of the other device of each pair extending downwardly from the bottom side thereof. Thus, the plates of one device are operable to hold and move the platform vertically while the plates of the other device are shifted to a different longitudinal position along the flange.

In such offshore drilling apparatus, wherein flanges extend longitudinally of the top deck of the platform and a drilling rig is disposed on the deck, a plurality of devices similar to the first form of the invention are connected between the rig and flanges for skidding the rig longitudinally across the deck. Thus, the cylinder or other fixed part of the actuator of each of such devices is attached to the rig, and the openings in the plates surrounding the rod on the piston reciprocable within the cylinder receive a flange on the deck, whereby, upon reciprocation of the rod, the plates are alternately swung between tilted position to grip the flange and skid the drilling rig in substantially perpendicular position for movement to a different longitudinal position along the flange.

In the drawings, wherein like reference characters are used throughout to designate like parts:

FIGS. 6A to 6D are elevational views of an illustrative embodiment of the second-described form of the invention, which, as shown diagrammatically in FIG. 1, is connected between the platform and a flange on one of the spuds for moving the platform vertically with respect to the spud;

Figure 9A:
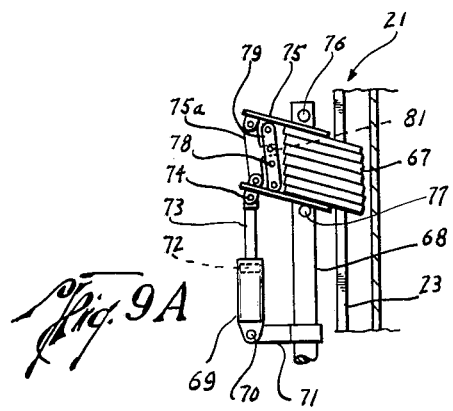
Figure 10:
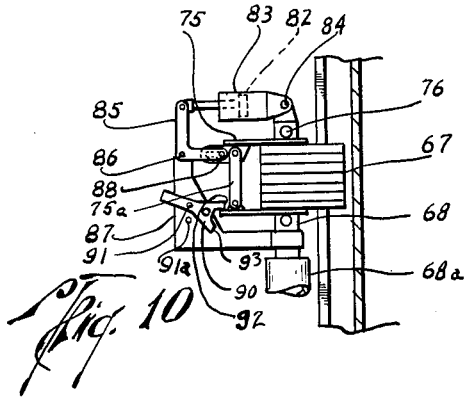
Figure 9B:
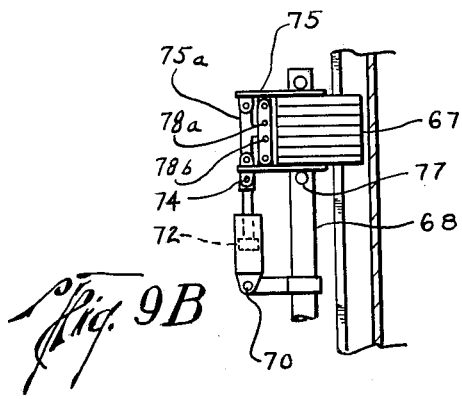
Figure 11:
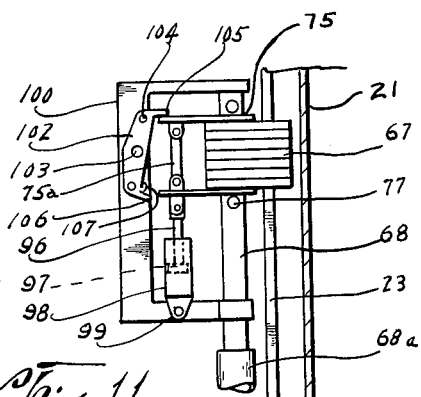
Figure 9C:
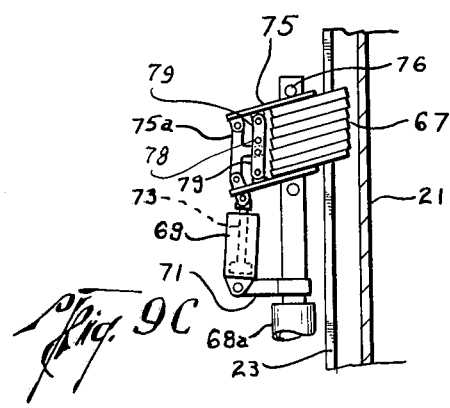

FIG. 6A showing the plates of the device in their tilted position to grip the flange of the spud;

FIG. 6B showing the device after the platform has been lifted with respect to the spud by reciprocation of the piston on the rod downwardly with respect to the cylinder on the platform;

FIG. 6C showing the plates shifted to their substantially perpendicular position upon reciprocation of the auxiliary piston upwardly with respect to the cylinder carried by the rod; and FIG. 6D showing the plates after they have been shifted to a different longitudinal position along the flange of the spud by reciprocation of the main piston upwardly within the cylinder on the platform;

FIG. 7 is an elevational view of one form of device for holding the platform with respect to the spud as the plates of the device shown in FIGS. 6A to 6D are shifted to a different longitudinal position along the flange thereof;

FIGS. 8A to 8E are elevational views of a pair of devices similar to those of FIGS. 6A to 6D, but having rods extending from cylinders on the top and bottom sides, respectively, of the platform for moving it vertically with respect to the spuds received therethrough;

FIG. 8A showing the plates of the upper device in their tilted position to grip a flange on one of the spuds and the plates of the lower device in position for movement longitudinally to a different position along the flange;

FIG. 8B showing the platform after it has been raised with respect to the spud by reciprocation of the piston of the rod carrying the plates of the upper device downwardly within its cylinder on the platform;

FIG. 8C showing the plates of the upper device moved to their position substantially perpendicular to the flange and the plates of the lower device shifted to their tilted position for gripping the flange;

FIG. 8D showing the platform lifted with respect to the spuds by reciprocation of the piston on the rod carrying the plates of the lower device downwardly within its cylinder on the platform; and FIG. 8E showing the plates of the upper device again moved to tilted position for gripping the flange, and the plates of the lower device moved to a substantially perpendicular position with respect to the flange, whereby the latter plates may be shifted to a different longitudinal position upon reciprocation of the piston on the rod carrying them upwardly with respect to the cylinder, as illustrated in FIG. 8A;

FIGS. 9A to 9C are elevational views of still another form of device for moving one member, such as a platform, vertically with respect to another member, such as a spud, and having parts shiftable in a manner to permit use of the device in lowering and pulling the spuds;

FIG. 9A showing such device with its plates tilted to a position for either lowering the spud onto the bottom of the ocean or pulling them free from the surface beneath the ocean bottom;

FIG. 9B showing the plates in their substantially perpendicular position to permit them to be moved to a different longitudinal position along the flange;

FIG. 9C showing such device with its plates tilted to a position for raising or lowering the platform along the stud or driving the stud into the subsurface;

FIGS. 10 and 11 are elevational views of further forms of the invention similar to the form of FIGS. 9A to 9C, with their shiftable parts positioned to permit swinging of the plates to a tilted position for raising or lowering the platform with respect to the spud.

Figure 1:
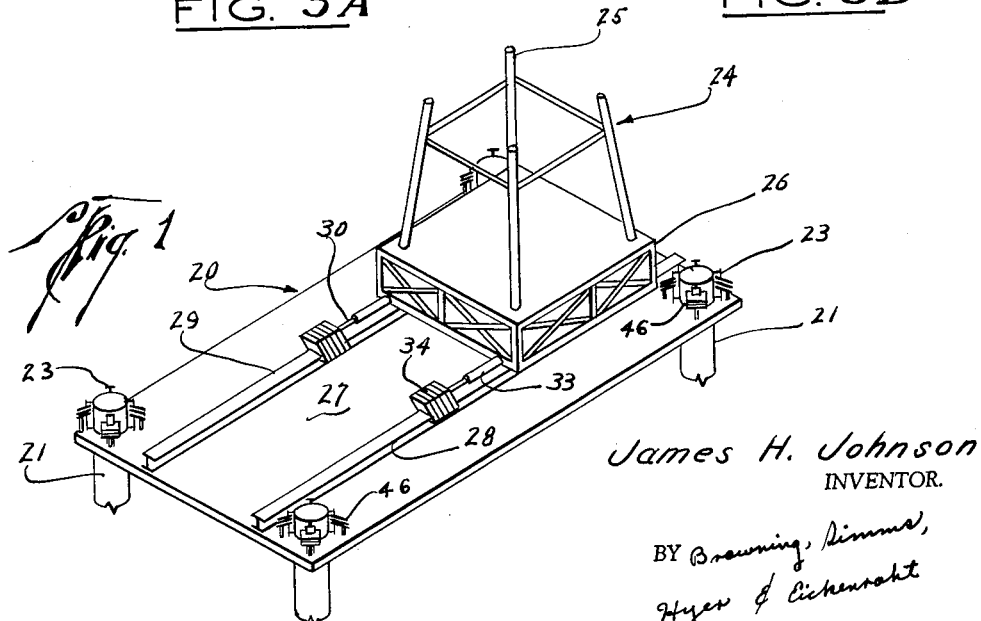
FIG. 1 is a perspective view of an offshore platform supported by spuds for movement vertically with respect thereto and having a drilling rig on the top deck thereof.

Turning now to a detailed description of the above-described drawings, the platform 20 shown in FIG. 1 is supported at an offshore location by four or more piles or spuds 21 received through openings 22 (see FIGS. 6 to 9) in the platform. As well known in the art, the lower ends of the spuds are anchored in the bottom of the water, and the platform 20 is movable vertically with respect to the spuds to locate it at a desired level above the water. More particularly, and as previously described, each spud is provided about its circumference with flanges 23 which are closely received within correspondingly shaped slots through the platform for guiding the platform during its vertical movement with respect to the spuds.

The drilling rig, which is illustrated diagrammatically at 24, conventionally includes a derrick 25 above a substructure 26 supported upon the deck 27 of the platform 20. More particularly, and as previously mentioned, the deck 27 includes longitudinally extending I-beams 28, having flanges 29 on their upper end for skidding the rig 24 across the platform.

It has been conventional to attach actuators between the platform and flanges 23 as well as between the rig and flanges 29 for transmitting a force between the platform and each of the spuds and rig, respectively, to raise and lower the platform and skid the rig into and out of drilling position on the platform.

However, in view of the novel devices of the present invention, such flanges do not require lugs, holes or other attaching parts for the actuators.

Figure 2:
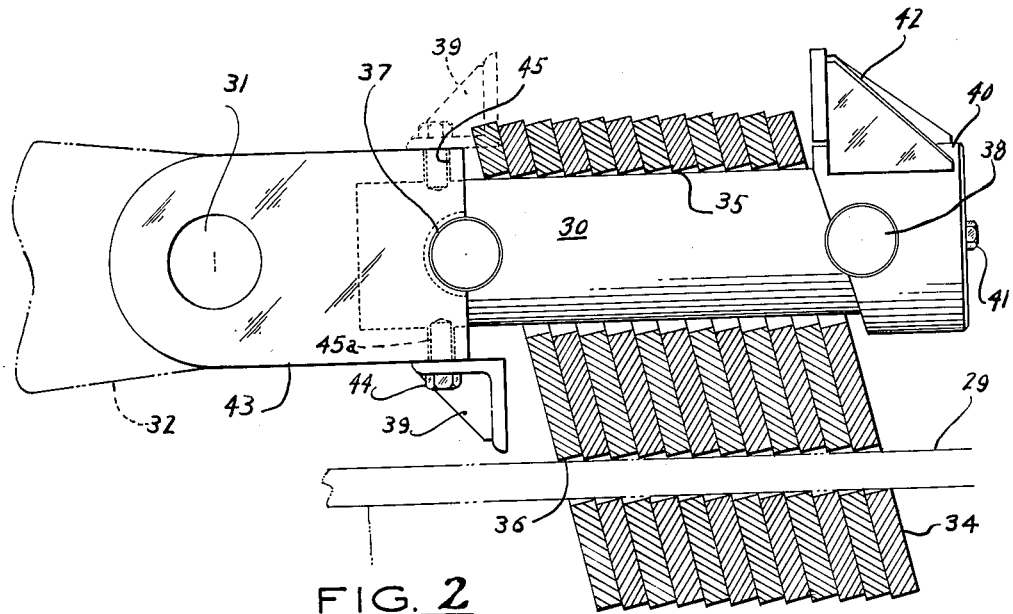
FIG. 2 is an elevational view, partly in section, of an illustrative embodiment of the first-described form of the invention, which is also shown diagrammatically in FIG. 1 to be connected between the drilling rig and the flanges on the platform deck for skidding the rig longitudinally thereacross.
Figure 3:
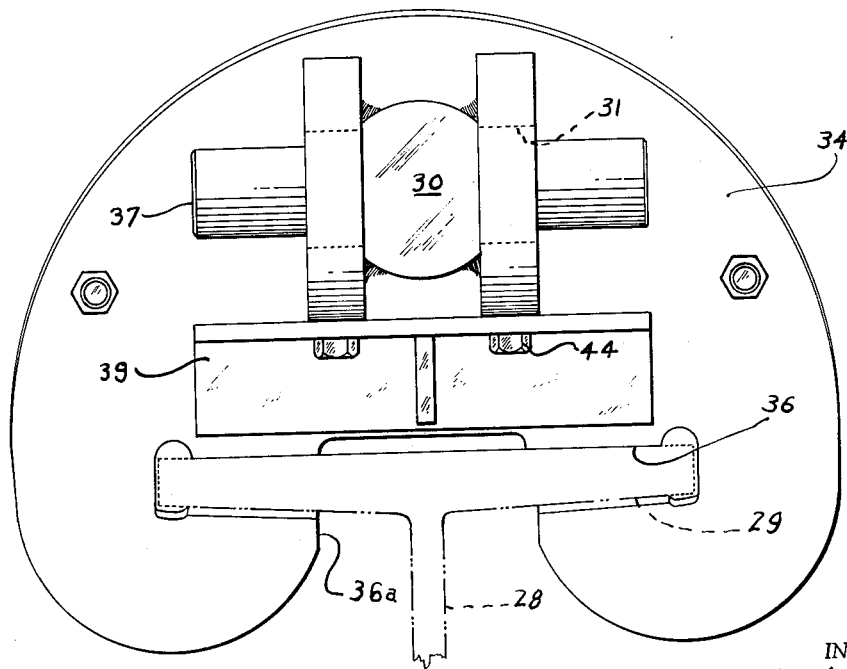
FIG. 3 is an end view of the device of FIG. 2, as seen from the left-hand side thereof.

The devices embodying the first form of the present invention, which are connected between the flanges 29 of I-beams 28 on the platform deck and the substructure 26 of drilling rig 24, are best shown in FIGS. 2 and 3 to include a rod 30 having one end pivotally attached, as by a pin through holes 31, to another rod 32 having a piston (not shown) reciprocable within a cylinder 33 attached to the drilling rig, as shown in FIG. 1. Hydraulic fluid may be introduced into and vented from the cylinder 33 on opposite sides of the piston in any suitable manner for reciprocating the piston to move the rod 30 in a desired direction. Obviously, however, actuators of other types may be employed for reciprocating the rod. Although the pivotal connection has certain advantages which will be apparent from the description, it should be understood that the rods 30 and 32 may be integral with one another.

A plurality of face-to-face plates 34 of metal or other hard, relatively incompressible material, are provided with openings 35 therein (see FIG. 2) which surround the rod 30 and additional openings in the form of slots 36 to one side of openings 35 to receive the flange 29. More particularly, the openings 35 are formed in the plates toward the upper ends thereof, and the slots 36 therein project outwardly from a recessed portion 36a on the lower end of the plates. As best shown in FIG. 2, the openings 35 and the slots 36 have a relatively loose fit with the rod and flange, respectively, to permit the plates to swing between a tilted position for gripping the flange, as shown in FIG. 2, and a position substantially perpendicular to the flange, as shown in FIG. 3, for movement longitudinally thereover. The adjacent faces of the plates may be lubricated to facilitate their sliding relative to one another as they are swung between tilted and substantially perpendicular positions.

Figure 4A:
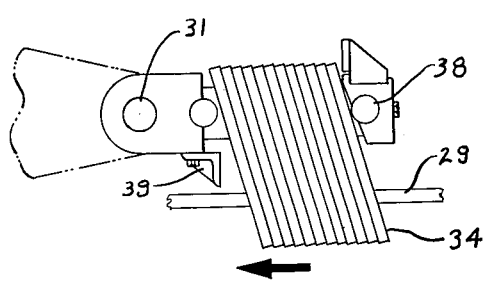
FIGS. 4A and 4B are reduced elevational views of the device of FIGS. 2 and 3, upon subjection of the rod to forces in the opposite directions indicated by the arrows.
Figure 4B:
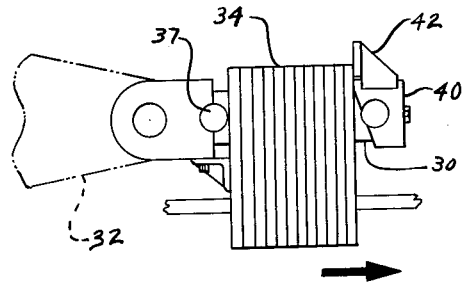
Figure 5A:
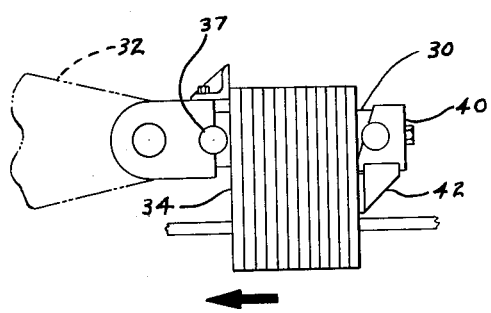
FIGS. 5A and 5B are views similar to FIGS. 4A and 4B, but with the abutments thereof shifted to positions for reversing movement of the rig with respect to the platform.
Figure 5B:
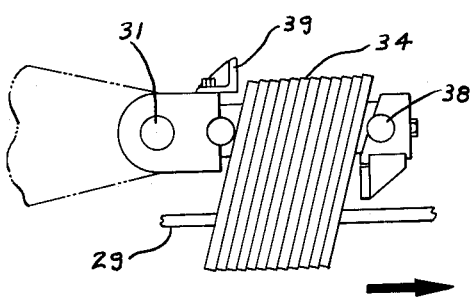

In the tilted position of the plates, the edges of the upper ends of the openings 35 grip the upper surfaces of the rod 30 and the upper and lower edges of slots 36 therein grip the upper and lower surfaces of the flange 29 to provide a force-transmitting connection between the rod and flange for moving the rig to the right upon the subjection of the rod to a leftward force, as indicated in FIGS. 2 and 4A, and moving the rig to the left upon subjection of the rod to a rightward force, as indicated in FIG. 5B. On the other hand, when the plates are disposed in their substantially perpendicular position, as shown in FIG. 3, the upper ends of the openings 35 and the slots 36 lie relatively parallel on the upper surfaces of the rod 30 and flange 29, such that the rod may be moved in either direction with respect to the flange, as illustrated in FIGS. 4B and 5A.

As can be seen from FIG. 2, openings 35 are sufficiently larger than rod 30 that the plates are free to move to various degrees of inclination without binding on the rod.

Pins 37 and 38 are carried by the rod 30 in spaced apart relation and extend radially outwardly from opposite sides thereof for engaging the outermost plates upon reciprocation of the rod in opposite directions. More particularly, the pins 37 and 38 are adapted to engage the outermost plates toward the upper ends thereof such that the plates in effect pivot about their slots 36. That is, for example, upon movement of the rod 30 to the left from the position of FIG. 4B to the position of FIG. 4A, the pin 38 will, by virtue of its engagement with the right outermost plate, tilt the plates to a position in which they grip the flange 29, as best shown in FIG. 2. Still further movement of the piston on the rod within its cylinder in a leftward direction will move the rig to the right due to the force-transmitting connection provided by the plates.

On the other hand, upon the movement of the rod to the right, from the position of FIG. 4A to FIG. 4B, the pin 37 will, by virtue of its engagement with the left outermost plate, swing the plates from their tilted to their substantially perpendicular position. In this latter position, the left outermost plate engages an abutment 39 on the rod adjacent the pin 37 and the right outermost plate engages an abutment 42 on the rod adjacent the pin 38 to locate the plates in their substantially perpendicular position and prevent them from being tilted in the direction of movement of the rod. Thus, further movement of the rod from left to right is effective to slide the plates to a different position longitudinally along the flange 29 depending upon the stroke of the piston rod 32. When the plates have reached this new position along the flange 29, the rod may be reciprocated from right to left so as to cause pin 38 to engage the right outermost plate and shift the plates back into the tilted position of FIGS. 2 and 4A for establishing a new grip upon the flange 29.

As shown in FIGS. 4A and 4B, the abutment 39 engages the left outermost plate intermediate the pin 37 and the slot 36 through such plate, and the abutment 42 engages the right outermost plate above the pin 38. It will be understood from FIGS. 5A and 5B, that a reversal of position of the abutments—i.e., the disposal of abutment 39 above pin 37 and abutment 42 intermediate the pin 38 and the slot in the right outermost plate—will render the device operable to skid the rig in an opposite direction over the deck of the platform. Thus, upon movement of the rod to the right, the plates will be swung into the tilted position of FIG. 5B, while, upon movement of the rod to the left, the plates will be swung into and located in the substantially perpendicular position of FIG. 5A. It will be understood that this operation of the device is effective to skid the rig from left to right over the deck of the platform, as shown in FIG. 1.

This shifting of the abutments 39 and 42 may be accomplished, without breaking the connection of the device with either the flange or the rig, by removal of the pin from holes 31, rotation of the rod 180 degrees within openings 35, and replacement of the pin to reattach the rod 30 to the rod 32.

The pins 38 are mounted on a head 40 which is removably disposable over the end of the rod 30 and connected thereto by a bolt 41. The abutment 42 is also mounted on the head 40 so that, upon removal of bolt 41, rotation of the head 40 one hundred and eighty degrees, and reinsertion of the bolt, the abutment 42 may be shifted from the position of FIGS. 4A and 4B to that of FIGS. 5A and 5B. At the same time, the abutment 39 is releasably connected by bolts 44 within either of diametrically opposed slots 45 and 45a in a head 43 mounting the pins 37 such that, upon removal of the bolts, the abutment 39 may be shifted from one of its positions to the other, and then secured in such other position by reinsertion of the bolt.

In the form of the device shown in the FIGS. 6A to 6D, openings through the face-to-face plates 46 surround a rod 47 and slots therein receive a flange 23 on the spud 21, similarly to the above-described form. Also, pins 48 and 49 are carried on the rod in spaced apart relation for engaging the outermost plates so as to move the plates with the rod, and a piston 50 attached to the lower end of the rod is reciprocable within a cylinder 51 on the platform 20 for moving the rod in opposite directions. More particularly, the cylinder 51 is on the top side of the platform 20 so that the rod 47 extends upwardly therefrom.

As distinguished from the first form of the invention, wherein the plates are carried by the rod of the device in a substantially vertical position, the plates 46 are carried in a substantially horizontal position. Therefore, these plates will not pivot about their slots merely upon frictional engagement with the flange 23, and an additional means, such as described below and above-mentioned, must be provided for shifting them.

In its preferred form, this additional means comprises an auxiliary cylinder 52 carried on the rod 47 by means of a bracket 53 to the side thereof opposite the flange 23, a piston 54 reciprocable within the cylinder, and a rod 55 on the cylinder extending exteriorly thereof and connected to the plates 46 for shifting them between their tilted and substantially perpendicular position. More particularly, the upper end of the rod 55 is pivotally connected to a pair of arms 57 pivotally connected at one end by a link 58 and disposed at their opposite ends between the pins 48 and 49 and the outermost of the plates 46. Thus, the end plates 57 and link 58 function as a parallelogram as the rod 55 is reciprocated by piston 54 to swing the plates in the manner described.

As in the case of the piston of the hydraulic actuator of the first-described form of the invention, the pistons 50 and 54 may be reciprocated by any suitable hydraulic system connected in well known manner to the cylinders 51 and 52, respectively. Also, of course, both pistons may be connected to the same system and synchronized for operation in the sequence to be described below.

It is apparent from FIGS. 6A and 6B that, in their tilted position, the plates 46 will grip the flange 23 of the spud to provide a force-transmitting connection between the spud and the platform which is effective to raise the platform upon movement of the rod in a downwardly direction with respect thereto. It is also apparent that the platform may be lowered upon movement of the rod upwardly with respect to the platform from the position of FIG. 6B to that of FIG. 6A. In both cases, the weight of the platform suspended from the spud maintains the plates in tilted position. For purposes of simplicity, however, these devices will be described only in connection with the platform raising operation.

When the platform has been so raised, and while the platform is held in a manner to be described against movement downwardly with respect to the spud 21, the piston 54 of the auxiliary cylinder 52 is moved upwardly to swing the plates to the substantially perpendicular position of FIG. 6C. It will be noted, in this respect, that the arms 57 are located in a position for so disposing the plates by the engagement of the piston 54 with the upper end of the auxiliary cylinder. At this time, the piston 50 of the main cylinder 51 may be moved upwardly so as to move the plates with the rods to a different position along the flange 23, which position is determined by the engagement of the piston 50 with the upper end of the cylinder 51, as shown in FIG. 6D. At this time, the piston 54 in the auxiliary cylinder 52 may be moved downwardly so as to again swing the plates 46 to their tilted position for gripping the flange 23. Then, the aforementioned holding means may be released to permit the platform to be raised further by movement of the piston downwardly within the cylinder 51, as shown by a comparison of FIGS. 6A and 6B.

It is contemplated that two or more of such devices will be employed for each spud, preferably in connection with oppositely disposed flanges on the spud, as shown in FIG. 6A. Thus, for example, these devices may be connected between only two of the flanges on each spud and the platform, and the holding means to be described hereinafter connected between the other flanges of each spud and the platform. Still other arrangements will be obvious to those skilled in the art.

As shown in FIG. 7, one suitable form of means for holding the platform 20 against movement downwardly with respect to the spuds comprises a device similar in many respect to the one above described. For example, these other devices include a plurality of face-to-face plates 59 having openings therein surrounding a rod 60 and slots therein receiving a flange 23 on a spud. Also, these plates are swung between the tilted position shown in FIG. 7 and a position substantially perpendicular to the flange by the pivotal connection of a rod 62 on a piston 63 reciprocable within a cylinder 64 on the platform to arms 61 pivotally connected by a link 61a.

However, in this other device, the rod 60 is secured to the platform by means of a bracket 65 or the like such that the rod is not reciprocable in a manner to move the platform with respect to the flange. Nevertheless, the arms 61 are received between the outermost plates 59 and the upper edge of bracket 65 and a pin 66 on the rod 60, respectively, to support the plates for swinging between tilted and substantially perpendicular positions.

As will be apparent from FIG. 7, as well as the foregoing description, when the piston 63 is moved downwardly to shift the plates 59 to the tilted position, the flange 23 is gripped by the plates to form a force-transmitting connection between the flange and the platform for suspending the platform from the flange when the plates 46 of the devices shown in FIGS. 6A and 6B are disposed in the substantially perpendicular position of FIGS. 6C and 6D. On the other hand, when the plates 46 of the devices of FIGS. 6A and 6D have been shifted to their tilted position, the plates 59 of these other devices are shifted to their substantially perpendicular position by reciprocation upwardly of the piston 63 within the cylinder 64 so that, upon a subsequent movement of the piston 50 downwardly within its cylinder to raise the platform with respect to the spud, the flange 23 will be permitted to slide freely through the slots in the plates 59.

In the embodiment of the invention shown in FIGS. 8A to 8E, a pair of devices of the type shown in FIGS. 6A to 6D are provided on the top and bottom, respectively, of the platform 20 for alternately lifting or lowering and holding the platform. That is, while one device on the top of the platform is operated to lift or lower the platform, the plates of the other device on the bottom side of the platform are shifted to a position for establishing a new bite on the flange 23. Then, while the plates of the device on the top of the platform are shifted to a substantially perpendicular position for movement along the flange to a new position, the plates of the device on the bottom of the platform are shifted to a position for gripping the flange to hold the platform against downward movement with respect thereto. Then, the device on the bottom of the platform is operated to lift or lower the platform, while at the same time shifting the plates of the device on the top of the platform to a different position along the flange.

Inasmuch as the devices of this embodiment of the invention correspond to that shown in FIGS. 6A to 6D, the same reference numerals are used. Thus, the cylinder 51 of the upper device is mounted on the top of the platform 20 so that the rod 47 on the piston 50 reciprocable therein extends upwardly. On the other hand, the cylinder of the lower device is mounted on the bottom of the platform so that the rod 47 on the piston reciprocable in the cylinder extends downwardly therefrom. The rods 55 on each of the auxiliary pistons extend in the same direction as the rods on which the cylinders 52 for such pistons are carried.

As shown in FIG. 8A, the auxiliary piston 54 of the upper device is moved downwardly so as to shift the plates 46 thereof into tilted position for gripping the flange 23, and the piston 50 thereof is moved upwardly within the cylinder 51 to extend the rod 47 to its outermost position. The piston 50 of each lower device has also been moved to its uppermost position, while the auxiliary piston 54 thereof has been moved upwardly to shift the plates 46 of such lower device to their substantially perpendicular position.

Thus, upon movement of the piston 50 of the upper device downwardly within the cylinder 51, as shown in FIG. 8B, the platform 20 is raised along the flange 23 of the spud 21. During such lifting of the platform, hydraulic fluid is kept upon the lower side of the pistons 50 and 54 of the lower device so that the plates 46 thereof slide upwardly over the flange 23, as also shown in FIG. 8B. When the platform has been lifted, the plates 46 of the lower device are shifted to the tilted position shown in FIG. 8C by movement of the auxiliary piston 54 thereof downwardly within cylinder 52. When the flange 23 is so gripped by the plates of the lower device, the plates 46 of the upper device are shifted to their substantially perpendicular position by movement of the auxiliary piston 54 thereof to the upper position shown in FIG. 8C.

At this time, the piston 50 of the lower device is moved downwardly, as shown in FIG. 8D, so that the platform 20 is again moved upwardly along the flange 23. During such movement, pressure is kept upon the upper side of the piston 50 and the lower side of pistons 54 of the upper device so that the plates 46 thereof are shifted upwardly along the flange 23.

When the platform has been so lifted, the auxiliary piston 54 of the upper device is moved downwardly to shift the plates thereof to their tilted position for gripping the flange 23, so that the platform 20 will be suspended from the flange as the plates 46 of the lower device are shifted to their substantially perpendicular position by the movement of the pistons 54 thereof upwardly, as shown in FIG. 8E. Thus, upon the admission of hydraulic fluid to the lower side of the piston 50 of the lower device, the plates 46 thereof are moved upwardly along the flange 23, whereupon the pair of devices are returned to the positions shown in FIG. 8A for another sequence of lifting and holding operations.

These platforms are normally transported to the desired offshore location with the spuds raised. When the location is reached, the spuds are lowered and driven, with the floatable platform acting as a fixed base. When the spuds have been driven, the platform is raised above the water level. At a later date, the platform is lowered back on to the water such that it provides a base for pulling the studs.

As previously described, each of the devices shown in FIGS. 9 to 11 is useful not only in lifting or lowering a platform or the like with respect to the spuds or piles, but also in driving or pulling the studs.

Referring first to the embodiment of the device shown in FIGS. 9A to 9C, it will be seen to include, similarly to the above-described devices, a plurality of face-to-face plates 67 having openings therethrough surrounding a rod 68 and slots therein to receive the flange 23 of the spud 21. The rod is in turn attached to a piston (not shown) reciprocable in a cylinder 68a (FIG. 9C) on the top side of a platform as in the devices previously described.

More particularly, this device is provided with an auxiliary cylinder 69 pivotally connected at 70 to a bracket 71 carried by the rod 68, and a piston 72 reciprocable within the cylinder and having a rod 73 thereon extending exteriorly of the cylinder. The upper end of the rod 73 is pivotally connected at 74 to arms 75 pivotally connected by a link 75a, as previously described for shifting plates 67 between either of the tilted positions of FIG. 9A or 9C and the substantially perpendicular position of FIG. 9B. Also, and again as described in connection with the previous embodiments, pins 76 and 77 on the rod 68 are engageable with the arms 75 adjacent the outermost plates for moving the plates with the rod upon reciprocation thereof.

However, in this embodiment of the invention, the stroke of the piston 72 within the auxliary cylinder 69 is of such length that the plates may be tilted to opposite sides of the substantially perpendicular position of FIG. 9B. That is, when the piston 72 is moved to its uppermost position within the cylinder 69, the plates 67 are tilted to the position shown in FIG. 9A, wherein movement of the rod 68 with respect to the platform is effective to raise or lower the spud. On the other hand, when the piston 72 is moved to its lowermost position within the cylinder 69, the plates 67 are shifted to the tilted position of FIG. 9C in which they are effective to raise or lower the platform with respect to the spud upon movement of the piston within the cylinder on the platform. Intermediate such tilted positions, the piston 72 is so disposed as to hold the plates in a substantially perpendicular position so that the rod 68 may be moved to shift the plates to a different longitudinal position along the flange 23.

In further explanation of this device, with the platform floating on the water level, the plates 67 may be shifted to the position of FIG. 9A and the rod moved downwardly with respect to the platform to lower the spud.

In this respect, it will be understood that the spud is suspended from the rod and platform so that the downward movement of the rod will not shift the plates out of their tilted position. When the spud has thus been lowered onto the bottom of the ocean, the plates are shifted, in a manner to be described, from the FIG. 9A to the FIG. 9C position. In this manner, downward movements of the piston on the rod will drive the spud into the ocean bottom.

When the spud has been driven as far as possible, further downward movements of the rod with respect to the platform will raise the latter with respect to the spud, as described in connection with the other embodiments. On the other hand, the platform may later be lowered, with the plates in the FIG. 9C position, by raising of the rod with respect to the platform.

When the platform has been lowered onto the water, the plates 46 may again be tilted to the FIG. 9A position. In this manner, the spud may be pulled from the ocean bottom and raised to a position for transporting by moving the rod 68 upwardly with respect to the platform.

The above-described shifting of the plates is accomplished by means which includes a shiftable part comprising a pin 78 removably disposable within one or the other of openings 78a and 78b through a link 79 pivotally connected at opposite ends between the arms 75. The link 75a is provided with a short stem 81 which projects inwardly from an intermediate portion thereof for abutment on its opposite sides with the pin 78 disposed in one of the openings 78a or 78b in the link 79. Thus, with the pin 78 disposed in the lower opening 78b, as shown in FIG. 9A, the stem 81 is adapted to abut on its lower side with the upper edge of the pin 78 to limit the downward movement of piston 72, and thereby locate the plates in the substantially perpendicular position of FIG. 9B, in response to downward movement of auxiliary piston 72 from the position of FIG. 9A. On the other hand, when the pin 78 is disposed within the upper opening 78a in link 79, the upper edge of the stem 81 will engage the lower side of the pin, upon movement of the piston 72 upwardly from the position of FIG. 9C, to locate the plates in their substantially horizontal position. Thus, the pins 78 may be inserted into either of the openings in order to render the device operative for the purposes above described.

As in the embodiment above described, the plates 67 of the embodiment of each of FIGS. 10 and 11 have openings therethrough which surround a rod 68 and slots therein to receive the flange 23 of the spud 21. Also, the rod 68 is attached to a piston reciprocable within a cylinder 68a on the top side of a platform (not shown), and pins 76 and 77 on the rod engage the arms 75 adjacent the outermost plates for moving the plates with the rod.

In the embodiment of FIG. 10, a piston 82 is reciprocable within an auxiliary cylinder 83 pivotally connected at 84 to the upper end of the rod 68 for swinging a rocker arm 85 about its pivotal connection 86 with a bracket 87 carried by the rod 68. The opposite end of the rocker arm 85 is provided with a pin 88 slidable within a slot on one of the arms 75 pivotally connected by link 75a for shifting the plates 67 between the substantially perpendicular position shown in FIG. 10 and tilted positions (not shown) on opposite sides thereof. Thus, upon movement of the pistons 82 to the right within the cylinder 81, the rocker arm 85 is swung in a clockwise direction so as to lower the link 75a and thereby tilt the flat plates 67 into gripping relation with the flange 23 for lifting the platform with respect to the spuds upon upward movement of the rod 68 with respect to the platform. On the other hand, when the platform is floating on the water level, such movement of the rod is operative to drive the spuds.

Return movement of the piston 82 to the intermediate position shown in FIG. 10 swings the plates back to their substantially perpendicular position, where they are located and prevented from tilting in an opposite direction by the engagement of the lower arm 75 with a Y-shaped stop part 90 pivotally mounted on the bracket 87. That is, as shown in FIG. 10, the part 90 is located by a pin 91 fitted through one opening in such part as well as the bracket 87 so that an upper arm 92 thereof engages with the lower arm 75 as the plates are swung to the substantially perpendicular position. On the other hand, the pin 91 may be removed from the opening in the bracket above described and the part 90 swung into another position so that the pin 91 may be placed in the bracket opening 91a therebeneath. In this manner, the lower arm 93 of the shiftable part 90 is positioned as to prevent downward movement of the lower arm 75. Thus, the device is made operable to swing the plates 67 between their substantially perpendicular position and a tilted position opposite to that previously described so that, upon upward movement of the rod 68 with respect to the platform and with the platform floating on the water, the spuds may be raised.

In the embodiment shown in FIG. 11, an auxiliary piston 97 having a rod 96 thereon is reciprocable within a cylinder 98 pivotally connected at 99 to a bracket 100 carried by the rod 68. As in the case of the embodiments above described, the rod 96 is pivotally connected to arms 75 which are pivotally connected by a link 75a for swinging the plates 67 between the substantially perpendicular position shown and tilted positions on opposite sides thereof.

The shiftable parts for this embodiment of the invention comprise a C-shaped member 102 pivotally connected at 103 along an intermediate point on the bracket 100. More particularly, a pin 104 is extendible through an opening in the member 102 and one of two openings in the bracket 100, so that the member may be positioned with either its upper leg 105 or its lower leg 106 located to engage the upper and lower arms 75, respectively.

Thus, with the member 102 positioned by the pin 104 as shown in FIG. 11, the piston 97 may be moved downwardly within the cylinder 98 so as to swing the plates 67 into gripping relation with the flange so that, upon downward movement of the rod 68 with respect to the platform, the device of FIG. 11 is adapted to raise the platform with respect to the spud. On the other hand, the pin 104 may be removed from the opening shown and extended through the other opening 107 in the bracket 100 so that the lower leg 106 of the member 102 engages with the lower arm 75 to locate the plates 67 in their substantially perpendicular position and permits them to swing to a tilted position opposite to that above described for gripping the flange. In this position then, the device is operative to raise the flange with respect to the platform as the rod 68 is moved upwardly with respect to the latter and with the platform floating on the water level.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A force-transmitting device for moving one member relatively to another, comprising a plurality of face-to-face plates having first openings therein to receive one of the members and having second openings spaced laterally of the first openings, said plates being swingable between a tilted position to grip said one member and a position substantially perpendicular to said one member, and means spaced laterally from said one member and including a rod extending through said second openings and connectable to the other member to be axially reciprocated thereby relative to said one member, said rod having parts thereon for moving the plates between said tilted position in which the plates grip said one member and said substantially perpendicular position in which the plates are free to slide along said one member, said second openings being sufficiently larger than the rod that the plates are free to move to various degrees of inclination without binding on the rod.

2. A force-transmitting device of the character defined in claim 1, wherein said means includes spaced apart pins on the rod engageable with the outermost plates to one side of their first openings to urge the plates toward tilted and substantially perpendicular positions, and abutments on the rod having surfaces engageable with said outermost plates during movement of the rod in one direction to locate the plates in said substantially perpendicular position.

3. A force-transmitting device of the character defined in claim 2, wherein one of said abutments engages an outermost plate intermediate the adjacent pin and the first opening in said plate receiving said one member, and wherein another of said abutments engages the other outermost plate on the side of the adjacent pin away from the first opening in such other plate.

4. A force-transmitting device of the character defined in claim 3, wherein said one abutment is movable to another position on the rod for engaging said outermost plate on the side of the adjacent pin away from said first opening in said plate, and said other abutment is movable to another position on the rod for engaging said outermost plate intermediate the adjacent pin and said first opening in said plate.

5. A force-transmitting device of the character defined in claim 3, wherein said rod is provided with a releasable connection to permit it to be rotated about its axis with respect to said other member for shifting said one abutment to a position engaging said outermost plate on the side of the adjacent pin away from said first opening in such a plate, and the other abutment to a position engaging said outermost plate intermediate the adjacent pin and said first opening in said plate.

6. A force-transmitting device of the character defined in claim 1 in combination with additional means carried by the rod and operable independently of the rod's movement for swinging the plates between said tilted position to grip said one member and form a force-transmitting connection between the rod and said one member for moving said members relative to one another during movement of the rod in one direction with respect to said one member, and said position substantially perpendicular to said one member for movement longitudinally therealong to permit the plates to be shifted to a different longitudinal position along said one member upon movement of the rod in the opposite direction.

7. A force-transmitting device of the character defined in claim 6 wherein said laterally spaced means includes spaced apart pins on the rod engageable with the outermost plates, and wherein said additional means includes an actuator including one part carried by the rod and another part reciprocable with respect to said one part and connected to the plates for swinging them between said substantially perpendicular and tilted positions.

8. A force-transmitting device of the character defined in claim 1 wherein the laterally spaced means includes a reversing means carried by the rod and operable without removing the device from either of said members to reverse the direction in which the plates are tilted to grip said one member so that with the reversing means in a first position, movement of the rod in one direction will tilt the plates to grip said one member and movement of the rod in an opposite direction will move the plates to said substantially perpendicular position and upon movement of the reversing means to a second position, movement of the rod in said opposite direction will tilt the plates to grip said one member and movement of the rod in said one direction will move the plates to said substantially perpendicular position.

References Cited in the file of this patent

UNITED STATES PATENTS

| | | |
|---|---|---|
| 2,170,323 | Gorshkoff | Aug. 22, 1939 |
| 2,592,448 | McMenimen | Apr. 8, 1952 |
| 2,601,762 | Clark | July 1, 1952 |
| 2,657,009 | Neis et al. | Oct. 27, 1953 |
| 2,673,065 | Patterson | Mar. 23, 1954 |
| 2,841,961 | Lucas | July 8, 1958 |
| 2,866,662 | Nemeth | Dec. 30, 1958 |
| 2,914,302 | Sampson et al. | Nov. 24, 1959 |

FOREIGN PATENTS

| | | |
|---|---|---|
| 746,252 | Great Britain | Mar. 14, 1956 |